June 11, 1968   E. HIMSTEDT   3,387,495
MEANS FOR DAMPENING VIBRATIONS IN HELICAL BOURDON TUBE GAGES
Filed Feb. 4, 1966
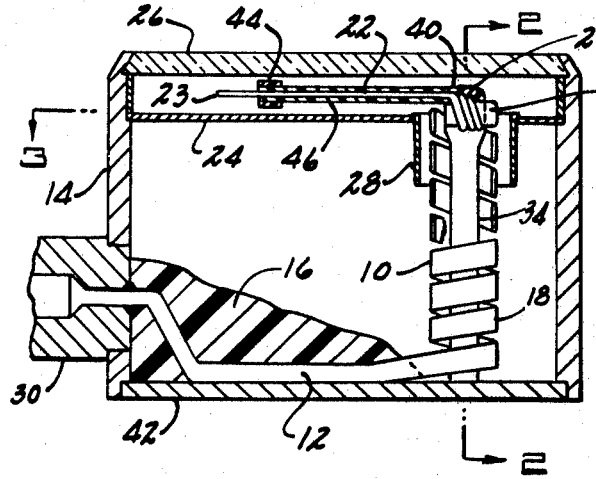
FIG_1
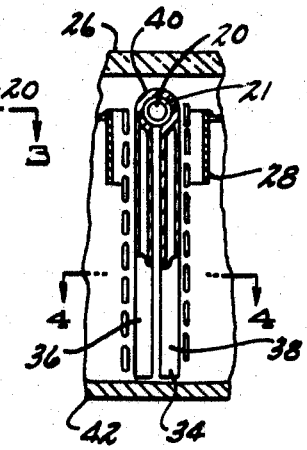
FIG_2
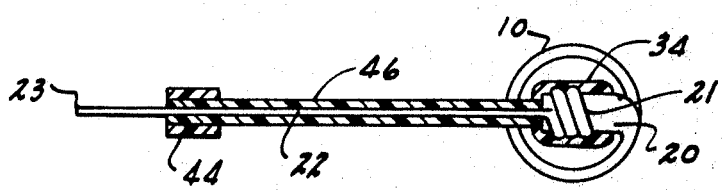
FIG_3
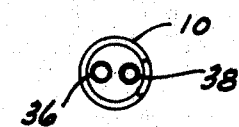
FIG_4
INVENTOR.
ERICH HIMSTEDT
BY
TENNES I. ERSTAD
JOHN E. McRAE
ATTORNEYS

3,387,495
MEANS FOR DAMPENING VIBRATIONS IN HELICAL BOURDON TUBE GAGES
Erich Himstedt, 200 W. Atara St., Monrovia, Calif. 91016
Filed Feb. 4, 1966, Ser. No. 525,047
5 Claims. (Cl. 73—414)

ABSTRACT OF THE DISCLOSURE

This invention relates to pressure gages of the multi-convolution helical Bourdon type, and especially to means for dampening shock and vibration in such gages. In one form the dampening means comprises an insert of tubular form draped over the pointer connection and extending within the coil in a manner to resist both lateral and axial vibrational motion of the coil. The insert may be made of heat shrinkable material which is flame-shrunk onto the pointer. Cooperating with this dampener insert is a vibration dampener bushing slipped onto the free end of the pointer, said bushing and insert being connected together into a unitary structure by an elongated sleeve telescoped over the pointer.

---

In the drawings:
FIG. 1 is a sectional view taken through one embodiment of the invention.
FIG. 2 is a sectional view taken on line 2—2 in FIG. 1.
FIG. 3 is an enlarged fragmentary sectional view taken on line 3—3 in FIG. 1.
FIG. 4 is a fragmentary sectional view taken on line 4—4 in FIG. 2.

As shown in FIG. 1, the invention embodies a helical Bourdon coil 10 having a lead-in conduit 12 anchored within the cylindrical case 14 by a glob of epoxy adhesive 16. The illustrated coil is provided with seven helical turns 18 of oblong cross section, the uppermost one of said turns connecting with an integral cylindrical tube portion 20 extending across the radius of the coil. Inserted as a tight fit on tube portion 20 is a coil section 21 formed as an integral part of a wire pointer 22; the use of coil section 21 as a mounting device is an old expedient in the gage art.

Pointer 22 is provided with a free end or tip 23 which reads against a graduated dial 24 suitably positioned in case 14. An overlying plastic crystal or viewing window 26 closes the case opening. To support the Bourdon coil against excessive radial flexure there may be provided a surrounding sleeve or thimble 28.

The gage thus far described is a conventional structure known to the art. In operation, fluid pressure is introduced through fitting 30 to cause an unwinding of the coil 10 convolutions. Such unwinding produces a rotation of pointer 22 about the coil axis, said pointer rotation being readable against the graduations on dial 24. Illustratively the gage may be called on to sense pressures from zero to five thousand p.s.i. under shock loadings ranging up to twenty G's applied at thirty five shocks per second. Case 14 and fitting 30 may be formed of stainless steel, the Bourdon tube of Inconel X, and crystal 26 of Lucite. The gage is specifically designed for aircraft installations, particularly military aircraft.

The present invention proposes mechanism for dampening out external vibrations before they can be transmitted to coil 10 or pointer 22. The dampening mechanism may include a coil insert in the form of a length of flexible plastic tubing 34 pre-folded to an inverted U-shape and draped over pointer mount structures 20 and 21 so that spaced leg portions 36 and 38 of the tubing fit loosely within coil 10. Tubing 34 is preferably an irradiated polyolefin material having the characteristic of shrinking at high temperatures; it is available for example under the trade name "Hyshrink." Flame heat applied to web portion 40 of the tubing causes the web portion to shrink around and tightly grip the surface of pointer mount structures 20, and 21. Tubing 34 is thus rigidly secured to the pointer structure and coil so that it will not shake loose under the presence of severe shock and vibration conditions.

The leg portions 36 and 38 of the vibration dampener insert 34 preferably extend the full length of coil 10. Any tendency of the coil to vibrate in the axial direction therefore causes the free ends of leg portions 36 and 38 to engage the case back wall 42 to thus dampen the vibrational tendencies. The plastic tubing has sufficient flexibility to buckle slightly within the coil so that the tubing does not interfere with desired pointer movement. It might be noted in this connection that the Bourdon coil has a relatively small diameter on the order of ¼ inch and that the work output of the pointer is relatively small. Thus it is important that the pointer movement be free and relatively unrestrained by the dampener insert.

Insert 34 has some stiffness in the radial direction, and the insert therefore is operable to dampen out the majority of the radial vibrations which would otherwise be transmitted to the coil. Radial vibrations in the coil usually originate at the free end of the coil, i.e., the upper end in FIG. 1. Insert 34 is anchored firmly to the coil at its upper free end portion 20. Any radial vibration stress originating at the coil upper end must displace the mass of insert 34 before it can cause coil vibration. The elongated axial dimension of the insert tends to keep the insert immobile and to impart a stiffness opposing radial movement of the coil. Thus the insert has been found to effectively block radial vibrations which are readily induced when the insert is not used.

In addition to insert 34 the preferred dampening mechanism includes a plastic bushing 44 formed for example of polytetrafluoroethylene, and located on pointer 22 a short distance from tip 23. In the case of a pointer having a length of ¾ inch the bushing can be located about $\frac{3}{16}$ inch from the tip of the pointer. The bushing is preferably connected rigidly to the coil dampener insert 34, as by a plastic sleeve 46, suitable epoxy adhesive being applied between the bushing, sleeve and coil insert to form a unitary dampener structure.

Bushing 44 projects above and below pointer 22, and in the presence of severe vibration will strike the dial and crystal before the tip of the pointer can do so. Thus, the bushing prevents the pointer from scratching the dial or crystal in a manner as would obliterate the dial graduations or obscure the readability of the gage. The bushing however also apparently dampens vibrations of the pointer which would otherwise occur. It should be noted that bushing 44, sleeve 46 and coil insert 34 are integrated into one unit so that the insert and bushing act together in stabilizing the coil and pointer. The mass of the bushing may also have some desirable action in minimizing resonance effects in the pointer.

I claim:
1. A gage comprising a case; a multi-convolution helical Bourdon coil within said case; said coil having an anchored end convolution and a free end convolution; a pointer including a mount structure secured to and extending radially across the free end convolution whereby winding-unwinding movements of the coil produce pointer rotation about the coil axis; a vibration dampening insert disposed within the coil; and means suspending the insert solely from the pointer mount structure; said insert consisting of a one piece structure having a web portion draped over the pointer mount structure and leg portions extending from the web portion within the coil.

2. The gage of claim 1 wherein the insert is formed of heat shrinkable tubing, the web portion of the insert having a shrink fit around the surface of the pointer mount structure.

3. A gage comprising a case; a multi-convolution helical Bourdon coil within said case; said coil having an anchored end convolution and a free end convolution; a pointer including a mount structure secured to and extending radially across the free end convolution whereby winding-unwinding movements of the coil produce pointer rotation about the coil axis; a vibration dampening insert disposed within the coil; and means suspending the insert solely from the pointer mount structure; said insert being formed of heat shrinkable material, and said suspending means comprising a portion of the insert having a heat shrink fit around the pointer mount structure.

4. A gage comprising a case; a multi-convolution helical Bourdon coil within said case; said coil having an anchored end convolution and a free end convolution; a pointer including a mount structure secured to and extending radially across the free end convolution whereby winding-unwinding movements of the coil produce pointer rotation about the coil axis; a vibration dampening insert disposed within the coil; and means suspending the insert solely from the pointer mount structure; a dial underlying the pointer; a viewing window overlying the pointer; and a protective bushing carried by the pointer a short distance from the pointer free end to prevent said end from striking the window or dial.

5. The gage of claim 4 and further comprising means rigidly connecting the bushing with the coil dampening insert; said connecting means comprising a sleeve telescoped over the pointer.

References Cited

UNITED STATES PATENTS

| 2,796,765 | 6/1957 | Huston | 73—414 |
| 3,267,734 | 8/1966 | Marks | 73—414 |
| 3,282,112 | 11/1966 | Mitchell | 73—414 |

FOREIGN PATENTS 375,750   5/1923   Germany.

LOUIS R. PRINCE, *Primary Examiner.*

DENIS E. CORR, *Assistant Examiner.*